United States Patent [19]

Roffael

[11] Patent Number: 5,866,057

[45] Date of Patent: *Feb. 2, 1999

[54] PROCESS FOR THE MANUFACTURE OF PARTICLE-BOARD AND FIBERBOARD

[75] Inventor: Edmone Roffael, Braunschweig, Germany

[73] Assignee: Casco Nobel AB, Stockholm, Sweden

[*] Notice: This patent issued on a continued prosecution application filed under 37 CFR 1.53(d), and is subject to the twenty year patent term provisions of 35 U.S.C. 154(a)(2).

[21] Appl. No.: 594,586

[22] Filed: Jan. 31, 1996

[51] Int. Cl.$^6$ ................... B27N 3/08; B27N 3/18
[52] U.S. Cl. .......... 264/113; 264/122; 264/126; 264/331.22; 264/DIG. 65; 264/DIG. 69; 264/112
[58] Field of Search ................. 264/109, 122, 264/37, 331.22, DIG. 69, DIG. 65, 126, 112, 113

[56] References Cited

U.S. PATENT DOCUMENTS

| | | | |
|---|---|---|---|
| 3,833,327 | 9/1974 | Pitzer et al. | 425/203 |
| 4,072,273 | 2/1978 | Reiniger | 241/19 |
| 4,113,919 | 9/1978 | Hartman | 428/529 |
| 4,201,851 | 5/1980 | Chen | 528/1 |
| 5,002,248 | 3/1991 | Knape et al. | 248/243 |

*Primary Examiner*—Jan H. Silbaugh
*Assistant Examiner*—Kenneth M. Jones
*Attorney, Agent, or Firm*—Burns, Doane, Swecker, & Mathis, L.L.P.

[57] ABSTRACT

A process is described for the manufacture of tannin-bonded particle- and fiberboard wherein the binding of wood chips and fibers is accomplished by obtaining the formaldehyde necessary for the cross-linking of tannin by the hydrolytic decomposition of the binder present in old particle- or fiberboard. The formaldehyde obtained by hydrolytic decomposition is cross-linked with the tannin by high temperature and moisture during pressing.

15 Claims, No Drawings

PROCESS FOR THE MANUFACTURE OF PARTICLE-BOARD AND FIBERBOARD

BACKGROUND OF THE INVENTION

In the manufacture of particle- and fiberboard, wood chips or fibers are normally glued with a binder, then spread out as particle mats or fiber mats and then pressed to particle or fiberboards under heat and pressure. The particle or fiberboards can be stacked hot after pressing, if needed.

Besides the acid-hardening urea-formaldehyde resins, alkali hardening phenol formaldehyde resins and adhesives based on diisocyanates as well as extracts of certain barks and woods which are combined under the category "Tannins" can be employed as the binder. Among the tannins, the so-called condensed tannins are especially suited for manufacture of particle and fiberboard.

As a rule, formaldehyde is added to the tannins as a matrix former in the manufacture of particle board. The tannins convert from the soluble state to the insoluble state by the reaction of the tannins with the formaldehyde, so that the tannin-formaldehyde resins are the actual binder.

The idea of developing adhesives based on tannin-formaldehyde resins goes back more than 30 years (Dalton 1950, 1953, Narayanamunti 1957, 1959 and Pomley et al. 1957, 1964). The cited work formed the bases for the use of tannin-formaldehyde resins as binders in wood materials. According to this work, extract material of certain barks and woods can be condensed with formaldehyde. The tannin-formaldehyde polymerizates formed from the condensation can be employed as the binder for manufacture of wood materials. Based on this technique, a few operations were able to produce plywood and particle board with tannin-formaldehyde resins contained in the binder system at various locations around the world. In the meantime, combinations of tannins with certain lignin sulfonates and sulfite spent liquors as fillers were discovered (DE-PS 3123999 A1). The combination of tannin with starch is also well known.

The application of tannin formaldehyde resins as a binder in particle boards proceeded slowly since the associated problems with application of the tannin-formaldehyde resins remained largely unsolved until now. These problems include the high viscosity of the resin in the useful consistency region (40–60% material density), relatively short drop time as a result of the high reactivity and the tendency of the tannin-formaldehyde resins to harden even before pressing in the equipment. These disadvantages, for one thing, and the nearly unlimited availability of cheap oil-based binders for another, have considerably delayed the development of these resin systems. Only the cut-back and increase in price of oil-based binders in the seventies has awakened interest in tannins and tannin-formaldehyde resins since this deals with materials recovered from secondary raw materials.

Tannins react at room temperature with formaldehyde and form tannin-formaldehyde resins. It has been shown that the tannin-formaldehyde resins have a very high viscosity in the technically relevant consistency region (40–60%) which causes problems in its preparation in normal cementing equipment. Further, uniform distribution of the binder when dispersing glue mixtures of high viscosity is not always guaranteed. The cause of the high viscosity is the reaction between the tannin and formaldehyde.

SUMMARY AND OBJECTS OF THE INVENTION

The goal of the present invention was to develop a process for binding of wood chips and fibers which eliminates the above disadvantages without detriment to the bonding strength of the tannins or the tannin-formaldehyde resins. Moreover, the goal was also not to introduce any disadvantages such as deterioration of mechanical properties of the wood materials produced with the tannin or the tannin-formaldehyde resins.

Surprisingly, it has been shown that this objective can be met not by using chips or fibers as usual from fresh, untreated wood for the production of particle board, but rather crushed products, wood chips or fibers from old formaldehyde-containing fiber and particle board, particularly plastic-bonded amino fiber and particle board, can be used as the raw material, for example particle board from used furniture which is to be disposed of.

The suggested process sensibly combines the use of old particle board with the utilization of the binder of formaldehyde contained therein. The formaldehyde is freed from the amino-plastic resin by hydrolysis and the tannin is cross-linked by the high temperature and moisture during pressing. In this way, the problems associated with the pre-hardening of the tannins and with the significant increase in their viscosity are eliminated and the old particle board or fiber boards are sensibly utilized at the same time.

The process also has the advantage that the chips or fibers containing the tannin can be stored for a longer time at room temperature before pressing without danger of prehardening since the hydrolysis of the resin present in the old boards, which leads to the cross-linking of the tannin, occurs mainly during pressing. In order to shorten the pressing time, the chips can be heated before, during and after gluing with the tannin. Understandably, the chips containing the tannin from old particle and fiberboard can be mixed together with chips or fibers from fresh, untreated wood treated with conventional binders.

Below are described exemplary embodiments to which the instant invention should not be limited.

DETAILED DESCRIPTION OF PREFERRED EMBODIMENTS

An industrially manufactured particle board plate containing a urea-formaldehyde resin as a binder was crushed with the help of a rotary hammer mill and wood chips and pulverized wood product were recovered. The produced chips were subsequently glued, along with an extract of quebracho wood containing mainly tannin (tanning material) amounting to 10% (solids/bone dry chips), with a 40 percent tannin solution and subsequently pressed to particle board. The pressing time amounted to approximately 10 minutes for a 19 mm thick board with a bulk density of 0.7 g/cm$^3$. After a storage time of 2 weeks, the board was tested for mechanical-technical properties. The results are listed in the following table:

| Bulk Density g/cm$^3$ | Bend Resistance N/mm$^2$ | Shear Resistance N/mm$^2$ | Thickness Expansion 2 h/24 h |
|---|---|---|---|
| 0.75 | 20 | 0.6 | 6    8 |

It can be deduced from this that the tannin added as the binder needs no formaldehyde for hardening besides that which was originally in the chips. Understandably, the process can also function if a small amount of formaldehyde is added to the tannins which increases its reactivity. The pressing time is thus shortened.

What is claimed is:

1. A process for the manufacture of tannin-bonded particle-board or fiberboard, consisting essentially of pressing tannin and wood chips and/or fibers derived from old formaldehyde-containing particle-board or fiberboard to form said particle-board or fiberboard, wherein an amount of formaldehyde sufficient to harden the tannin is provided by hydrolytic decomposition of a binder in said wood chips and/or fibers during the pressing.

2. A process according to claim 1, wherein the tannin is fed to the chips or fibers in a heated state at temperatures between 100° and 120° C.

3. A process according to claim 1, wherein pressing of the glued chips or fibers follows a steam-injection process.

4. A process according to claim 1, wherein the tannin contains spent sulfite liquor as a filler.

5. A process according to claim 1, wherein the tannin contains starch as a filler.

6. A process according to claim 1, wherein the tannin is fed to the chips from old particle board as a fluid with a solids content of 30%.

7. A process according to claim 1, wherein the tannin is fed to the chips from old particle or fiberboard as a fluid with a tannin content of 60%.

8. A process according to claim 1, wherein the tannin is adjusted to a pH value of 2–11.

9. A process according to claim 1, wherein pH is adjusted by the use of organic acids.

10. A process according to claim 9, wherein the organic acid used to adjust the pH value is formic acid.

11. A process according to claim 1, wherein tannin-glued chips or fibers are stored for several hours in the glued state until they are pressed into particle or fiberboards.

12. A process according to claim 1, wherein the chips or fibers are treated with water prior to gluing with the tannin.

13. A process according to claim 8, wherein the tannin is adjusted to a pH value of between 3 and 9.

14. A process for the manufacture of tannin-bonded multi-layered particle-board or fiberboard, consisting essentially of pressing tannin and wood chips and/or fibers derived from old formaldehyde-containing particle-board or fiberboard to form said multi-layered particle-board or fiberboard, wherein said tannin and wood chips and/or fibers are applied only to covering layers of said multi-layered particle-board or fiberboard, and an amount of formaldehyde sufficient to harden the tannin is provided by hydrolytic decomposition of a binder in said wood chips and/or fibers during the pressing.

15. A process for the manufacture of tannin-bonded multi-layered particle-board or fiberboard, consisting essentially of pressing tannin and wood chips and/or fibers derived from old formadehyde-containing particle-board or fiberboard to form said multi-layered particle-board or fiberboard, wherein said tannin and wood chips are applied only to a middle layer of said multi-layered particle-board or fiberboard, and an amount of formaldehyde sufficient to harden the tannin is provided by hydrolytic decomposition of a binder in said wood chips and/or fibers during the pressing.

* * * * *